2,981,619
METHOD OF INHIBITING PLANT GROWTH

Melvin J. Josephs, Midland, Mich., assignor to The Dow Chemical Company, Midland, Mich., a corporation of Delaware No Drawing. Filed Apr. 5, 1957, Ser. No. 650,856

6 Claims. (Cl. 71—2.3)

This invention is concerned with the modification of the growth characteristics of plants and is particularly directed to a method for the suppression and control of the growth of germinant seeds, emerging seedlings and established plants of many undesirable weed species.

It is an object of the present invention to provide a new method for modifying the growth characteristics of plants. Another object is the provision of a method for the suppression and control of the growth of undesirable vegetation. A further object is the provision of a method for the control of the growth of germinant seeds and emerging seedlings. An additional object is the provision of a method for the suppression of the growth of undesirable seeds and emerging seedlings, and particularly those of small-seeded grasses and weeds, in soil or growth media which is supporting the growth of established plants or planted with deep-planted crops such as cotton and peas. An additional object is the provision of novel compositions adapted to be employed in the new methods of modifying the growth characteristics of plants. Other objects will become apparent from the following specification and claims.

According to the present invention, it has been discovered that the growth characteristics of plants may be modified or altered by exposing plants or plant parts to the action of a growth-altering amount of a 4,6-disecondary-butyl-α-(dialkylamino)-o-cresol compound having the formula

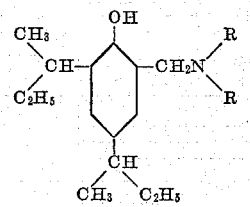

wherein each R represents methyl or ethyl. More particularly, it has been discovered that the growth of germinant seeds, seedlings and established vegetation may be suppressed and controlled by exposing the seeds, seedlings or the roots or above-ground portions of the growing plants to the action of a growth-inhibiting amount of the 4,6-disecondary-butyl-α-(dialkylamino)-o-cresol compounds. These cresol compounds are somewhat soluble in many organic solvents and of low solubility in water. They have been found to have a high toxicity against germinant seeds and emerging seedlings and particularly those of small-seeded grasses and weeds. Thus, they may be employed for the selective control of many small-seeded weeds in growth media supporting the growth of well-established plants or planted with deep-planted crops such as corn, cotton, peas, and soybeans. Further, the cresol compounds have a high degree of persistency in soil and give excellent controls of small-seeded grasses such as crabgrass and Johnson grass for periods ranging up to several months.

The exposure of growing plants and plant parts or a viable form of plants to the action of the cresol compounds gives rise to varying responses depending upon the form and nature of the plant, the stage of growth or maturity of the plant and the dosage of cresol compound at which the exposure is carried out, as well as the weather conditions of temperature and moisture. When large dosages are applied to the foliage of plants, a substantially complete kill of most plant species is obtained. The distribution of large dosages in growth media controls the growth of most germinant seeds, seedlings and established plants. This approaches a sterilization action. The weathering action of the sun and rain and possible decomposition of the cresol compounds by the action of bacteria and other soil organisms eventually reduces the concentration of the compounds to a minimum in the soil. Soil applications of more dilute dosages of the cresol compounds suppress the growth of many small seeded weed species while having little or no effect upon established plants or the seeds of deep planted crops. Thus the compounds may be employed for the selective control of many small seeded weeds in plantings of deep planted crop plants or in stands of established plants.

The exposure of the viable form of the plant to the action of a growth altering amount of the cresol compounds is essential for the practice of the present invention. In foliage treatments for the control of the growth of vegetation, good results are obtained when from 5 to 50 pounds of the cresol compounds are applied per acre. In non-selective applications to growth media, good results are obtained when a dosage of the cresol compounds is supplied in the amount of about 8 to 200 parts or more by weight per million parts by weight of the medium. In non-selective applications to soil, good results are obtained when the cresol compounds are distributed at the rate of from about 5.0 to 100 pounds or more per acre and through such a cross section of the soil as to provide for the presence therein of an effective concentration of the treating agents. In such applications, it is desirable that the compounds be distributed to a depth of at least 0.25 inch. In pre-emergent and post-emergent applications for the control of the growth of the germinant seeds and seedlings of many undesirable small seeded weeds, and particularly those of small seeded grasses, in plantings of deep-planted crop plants or in established stands of crop plants such as cotton, good results are obtained when the cresol compounds are applied to the surface of the soil and/or the foliage of the small-seeded weed species at a dosage of from 5.0 to 30 pounds per acre. In the pre-emergent applications to soil, it is desirable that the cresol compounds be distributed in the soil to a depth no greater than 1.5 inches.

The method of the present invention may be carried out by applying to the above ground portion of plants or by applying to the growth media the unmodified cresol compounds. However, the present method also embraces the employment of a liquid or dust composition containing said compounds. In such usage, the compounds may be modified with one or more of a plurality of additaments or herbicide adjuvants such as water, petroleum distillates, or other organic solvent carriers, surface active dispersing agents and finely divided inert solids. Depending upon the concentration of the toxicant, such augmented compositions are adapted to be distributed in or on the soil or on the above ground portion of the plants or employed as concentrates and subsequently diluted with additional inert carrier to produce the ultimate treating compositions.

The exact concentration of cresol compounds to be employed in compositions for the treatment of growth media and plants is not critical and may vary considerably provided the required dosage of active agent is supplied in the growth media or upon the above ground surfaces of plants. The concentration of toxicant in liquid compositions employed to supply the desired dosage generally is from about 0.1 to 50 percent by weight, although concentrations of 0.0001 percent by weight may be employed in irrigation treatments of soil. In dusts, the concentration of toxicant may be from 1.0 to 50 percent by weight, although concentrations as low as 0.1 percent are sometimes employed. In compositions to be employed as concentrates, the toxicant oftentimes is present in a concentration of from about 5 to 95 percent by weight.

The quantity of treating composition to be applied may vary considerably provided the required dosage of active ingredient is applied in sufficient of the finished composition adequately to cover the vegetation to be treated or to facilitate the penetration and distribution of the active ingredient in growth media. The required amount of active ingredient in the soil conveniently may be supplied per acre treated in from 40 to 27,000 gallons or more of the aqueous carrier, in 5 to 50 gallons of organic solvent, or in from 50 to 2000 pounds of inert solid carrier. In the treatment of seedling weeds, good coverage is obtained when using from 10 to 100 gallons or more of finished spray composition per acre. Where large succulent vegetation is concerned, it is frequently desirable to employ up to 250 gallons or more of the finished spray composition per acre to assure complete coverage of the above-ground portion of the vegetation. In the application of dusts to plant foliage, good results are obtained with from 50 to 2000 pounds of finished dust composition per acre, the only requirements being that the required toxicant dosage be supplied in sufficient dust to achieve good coverage of the foliage.

Liquid compositions containing the desired amount of the cresol compounds may be prepared by dissolving the toxicants in an organic liquid such as acetone, xylene or petroleum distillates or by dispersing the toxicants in water with or without the aid of a suitable surface active dispersing agent such as an ionic or non-ionic emulsifying agent. The aqueous compositions may contain one or more water-immiscible solvents for the cresol compounds. In such compositions the carrier comprises an aqueous emulsion, that is a mixture of water-immiscible solvent, emulsifying agent and water. The choice of dispersing and emulsifying agent and the amount thereof employed is dictated by the nature of the composition type and by the ability of the agent to facilitate the dispersion of the compound in the carrier to produce the desired composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like. The surface active dispersing agents are generally employed in the liquid compositions in the amount of from 1 to 20 percent by weight of the combined weight of the cresol compound and the surface-active agent.

In the preparation of dust compositions, the cresol compounds are dispersed in and on a finely divided inert solid such as talc, chalk, gypsum and the like. In such operations, the carrier is mechanically ground with the compounds or wet with a volatile organic solvent solution thereof.

Similarly, dust compositions containing the compound may be prepared from various of the solid surface active dispersing agents such as bentonite, fuller's earth, attapulgite and other clays. Depending upon the proportions of ingredients, these dust compositions may be employed as concentrates and subsequently diluted with additional solid surface active dispersing agent or with talc, chalk, gypsum and the like to obtain the desired amount of active ingredient in a composition adapted to be employed for the control of the growth of vegetation. Also such concentrate dust compositions may be dispersed in water with or without the aid of a dispersing agent to form spray mixtures.

When operating in accordance with the present invention, growth inhibiting amounts of the compounds or a composition containing the compounds are dispersed in any convenient fashion in soil or other growth media, i.e., by simple mixing with the growth media, by applying to the surface of soil and thereafter dragging or disking into the soil to the desired depth, or by employing a liquid carrier to accomplish the penetration and impregnation. The application of the spray and dust compositions to the surface of soil or to the above ground surfaces of plants may be carried out by conventional methods, for example with power dusters, boom or hand sprayers and spray dusters.

In a further method, the distribution in soil may be accomplished by introducing the toxicant in the water employed to irrigate the soil. In such procedure, the amount of water may be varied in accordance with the porosity and water holding capacity of the soil in order to obtain the desired depth of distribution of the toxicant.

The following examples illustrate the present invention but are not to be construed as limiting.

*Example 1*

25 parts by weight of 4,6-disecondary-butyl-α-(dimethyl-amino)-o-cresol, 2 parts of an alkyl aryl sulfonate (Nacconol NR), 2 parts of a substituted benzoid alkyl sulfonic acid (Daxad No. 27) and 71 parts of fuller's earth were mixed and ground together to prepare a wettable powder concentrate composition. A portion of this concentrate was dispersed in water to produce an aqueous composition containing 0.4 pound of the cresol compound per 100 gallons of ultimate mixture. This composition was employed for the treatment of soil areas which had been prepared and seeded to Japanese millet, radish and wild oats. In the treating operations, the composition was applied to the soil areas as a soil drench to supply a substantially uniform dosage of 50 pounds of the o-cresol compound per acre. Other areas similarly prepared and seeded were left untreated to serve as checks.

After 3 weeks, the treated areas were examined to ascertain what control of the growth of seeds and emerging seedlings had been obtained. The results of such examination are set forth in the following table:

| Seed Species | Percent Control of the Growth of the Seeds and Emerging Seedlings |
| --- | --- |
| Japanese Millet | 100 |
| Radish | 97 |
| Wild Oats | 100 |

At the time of observation, the untreated check areas were found to support luxuriant and vigorously growing stands of the named plant species.

*Example 2*

A portion of the concentrate composition of Example 1 was dispersed in water to produce an aqueous composition containing 50 pounds of the 4,6-disecondary-butyl-α-(dimethylamino)-o-cresol compound per 1000 gallons of water. This composition was employed for the treatment of soil areas which had been prepared and seeded to Japanese millet. In the treating operations, the composition was applied to the surface of the soil at a substantially uniform dosage of 50 pounds of cresol compound per acre. Other areas similarly prepared and seeded were left untreated to serve as checks.

After three weeks, examination of the areas showed a complete control of the growth of the seeds and emerging seedlings of Japanese millet in the treated areas with luxuriant and vigorously growing stands of Japanese millet in the untreated checks.

*Example 3*

25 parts of 4,6-disecondary-butyl-α-(diethylamino)-o-cresol and 10 parts of a sorbitan monolaurate polyoxyethylene derivative (Tween 20) are mixed together to prepare a water dispersible concentrate composition. A portion of this concentrate composition is dispersed in water to produce an aqueous composition containing 0.4 pounds of the cresol compound per 100 gallons of water. This composition is employed for the treatment of soil areas which have been prepared and seeded to Japanese millet and wild oats. In the treating operations, the composition is applied to the soil areas as a soil drench to supply a substantially uniform dosage of 50 pounds of the cresol compound per acre. Other areas similarly prepared and seeded are left untreated to serve as checks.

After three weeks, examination of the areas shows a complete control of the growth of the seeds and emerging seedlings of Japanese millet and wild oats in the treated areas with luxuriant and vigorously growing stands of both named species in the untreated checks.

Example 4

A portion of the concentrate composition as described in Example 1 was dispersed in water to produce an aqueous composition containing 0.16 pound of 4,6-disecondary-butyl-α-(dimethylamino)-o-cresol per 100 gallons of ultimate mixture. This composition was employed for the treatment of soil areas which had been prepared and seeded to corn, crabgrass, flax and cotton. In the treating operations, the composition was applied to the soil areas as a soil drench to supply a substantially uniform dosage of 20 pounds of the o-cresol compound per acre. Other areas similarly prepared and seeded were left untreated to serve as checks.

After 3 weeks, the treated areas were examined to ascertain what control of the growth of seeds and emerging seedlings had been obtained. The results of such examination are set forth in the following table:

| Seed Species | Percent Control of the Growth of the Seeds and Emerging Seedlings |
|---|---|
| Corn | 0 |
| Crabgrass | 70 |
| Flax | 85 |
| Cotton | 0 |

At the time of the observations, the check areas were found to support luxuriant and vigorously growing stands of the named plant species.

Example 5

25 parts of 4,6-disecondary-butyl-α-(diethylamino)-o-cresol, 2 parts of Nacconol NR, 2 parts of a polymerized sodium salt of a substituted benzoid alkyl sulfonic acid (Daxad No. 27) and 71 parts of fuller's earth are mixed together to prepare a wettable powder concentrate composition.

In a similar manner 25 parts of 4,6-disecondary-butyl-α-(N-ethyl-N-methylamino)-o-cresol and 10 parts of a sorbitan monolaurate polyoxyethylene derivative (Tween 20) are mixed together to prepare a water dispersible concentrate composition.

These concentrate compositions are adapted to be dispersed in water to prepare aqueous compositions having very desirable wetting and penetrating properties. The latter aqueous compositions may be employed to distribute growth altering amounts of the cresol compounds in the soil or upon the surfaces of plants and plant parts.

The compounds as employed in accordance with the present invention may be prepared according to known methods by causing an interaction between formaldehyde, a suitable dialkyl amine ((R)(R)NH) and 2,4-disecondary-butyl phenol. In a convenient method of carrying out the reaction, one molecular proportion of formaldehyde is added to a mixture comprising one molecular proportion of each of the phenol and amine reactants in a solvent such as ethanol. The reaction takes place readily at temperatures above 20° C. with the production of the desired product and water of reaction. Upon completion of the reaction, the reaction mixture may be cooled and filtered to separate the desired product as a crystalline solid.

I claim:

1. A method for the selective control of small seeded grasses and broad leaf weeds which comprises exposing growing plants and plant parts to the action of a growth inhibiting amount of a 4,6-disecondary-butyl-α-(dialkylamino)-o-cresol compound having the formula

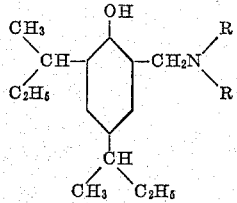

wherein each R represents a member of the group consisting of methyl and ethyl.

2. A method as claimed in claim 1, wherein the cresol compound is employed in the form of a composition made up of the cresol compound in intimate admixture with a herbicide adjuvant as a carrier therefor.

3. An agronomical practice for the control of growth of undesired vegetation which comprises impregnating soil with a growth-inhibiting concentration of a cresol compound having the formula

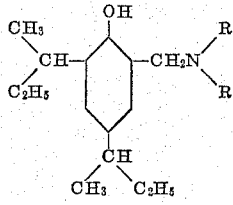

wherein each R represents a member of the group consisting of methyl and ethyl.

4. A method claimed in claim 3 wherein the soil is impregnated with the cresol compound at a concentration of at least 8 parts by weight per million parts by weight of soil.

5. A method as claimed in claim 1 wherein the cresol compound is 4,6-disecondary-butyl-α-(dimethylamino)-o-cresol.

6. A method for the selective control of the growth of the germinant seeds and emerging seedlings of small seeded grasses and broad leaf weeds in soil planted with the seeds of deep-planted crop plants which comprises distributing in such soil to a depth not to exceed 1.5 inches, a dosage of from 5 to 30 pounds per acre of a cresol compound having the formula

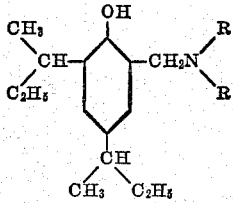

wherein each R represents a member of the group consisting of methyl and ethyl.

References Cited in the file of this patent

UNITED STATES PATENTS

| | | |
|---|---|---|
| 2,014,720 | Christiansen et al. | Aug. 17, 1935 |
| 2,262,720 | Earle | Nov. 11, 1941 |
| 2,747,982 | Mussell | May 29, 1956 |
| 2,747,983 | Mussell | May 29, 1956 |
| 2,784,138 | Wegler et al. | Mar. 5, 1957 |
| 2,842,595 | Rigterink | July 8, 1958 |

OTHER REFERENCES

King: U.S. Dept. of Agri. Handbook No. 69, March 1954, page 123.

Burckhatter et al.: J.A.C.S., vol. 68, October 1946, pages 1894 to 1901.